May 19, 1931. J. T. SULLIVAN 1,806,095
MOTOR VEHICLE
Filed July 19, 1927 3 Sheets-Sheet 1
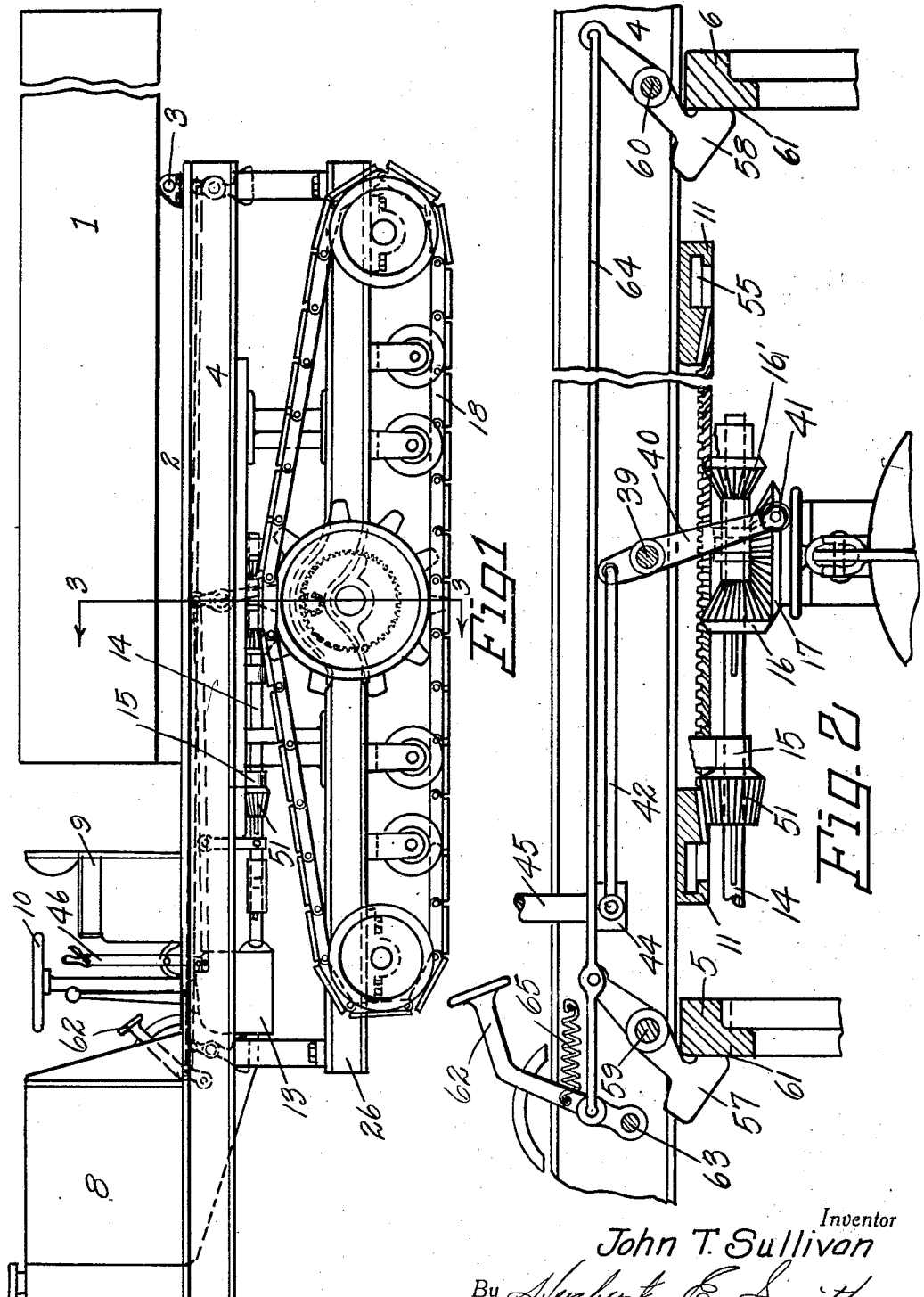
Inventor
John T. Sullivan
By Herbert E. Smith
Attorney May 19, 1931. J. T. SULLIVAN 1,806,095
MOTOR VEHICLE
Filed July 19, 1927 3 Sheets-Sheet 2
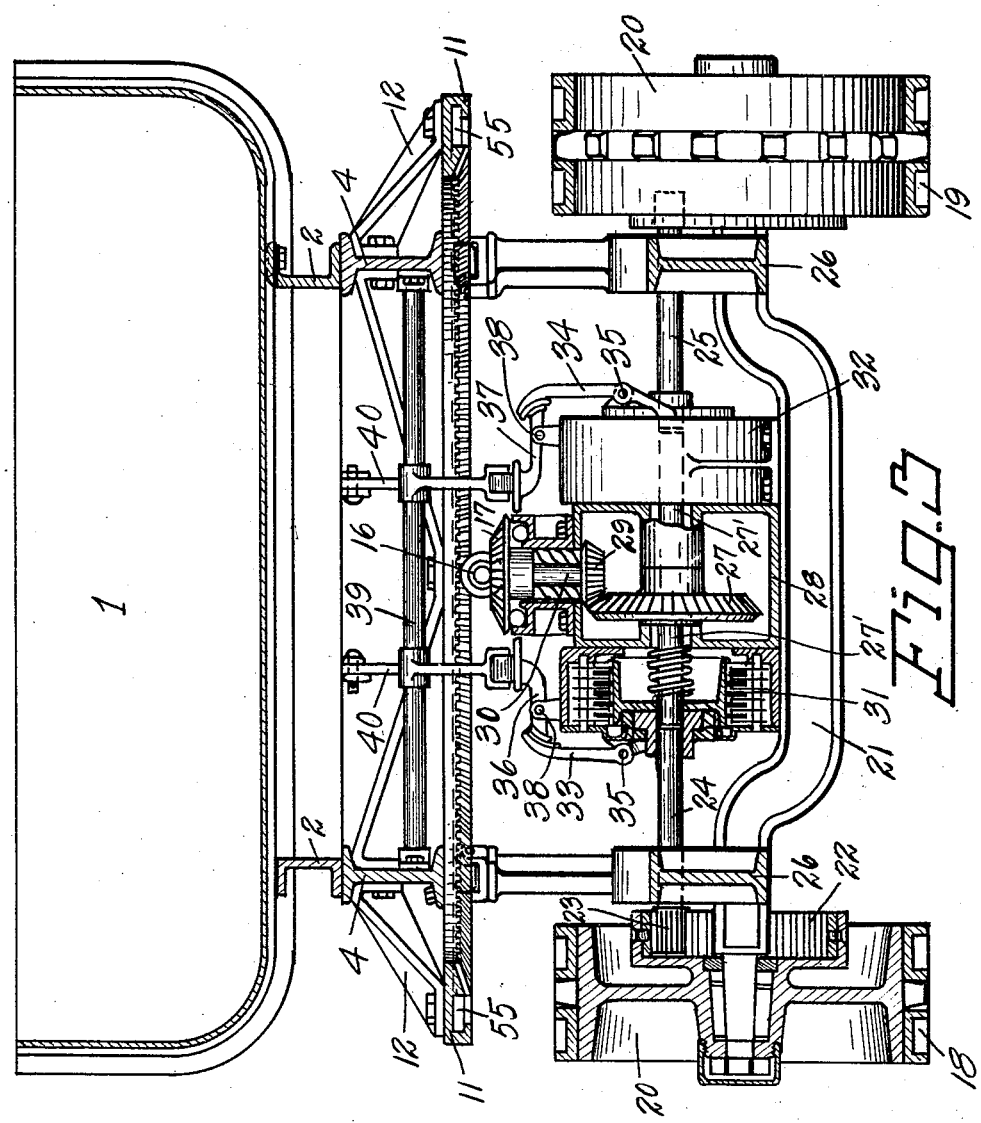
Inventor
John T. Sullivan
By Herbert E. Smith
Attorney May 19, 1931. J. T. SULLIVAN 1,806,095
MOTOR VEHICLE
Filed July 19, 1927 3 Sheets-Sheet 3
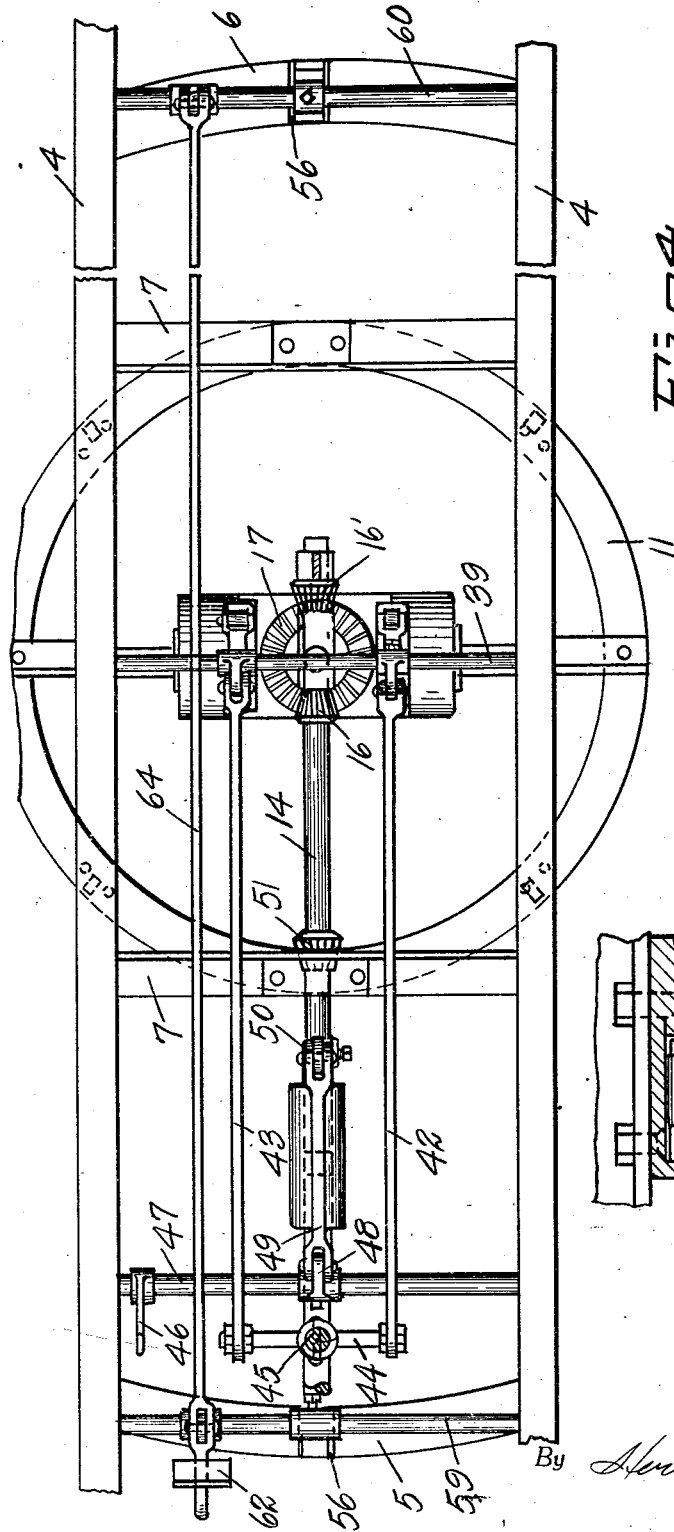
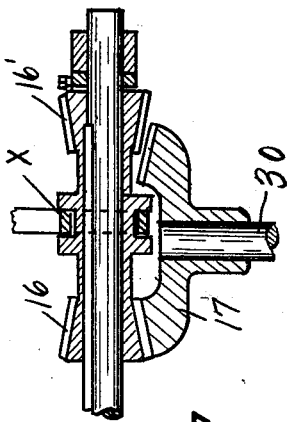
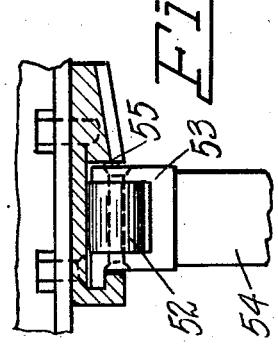
Inventor
John T. Sullivan
By Herbert E. Smith
Attorney Patented May 19, 1931

1,806,095

UNITED STATES PATENT OFFICE

JOHN T. SULLIVAN, OF LEWISTON, IDAHO

MOTOR VEHICLE

Application filed July 19, 1927. Serial No. 206,877.

My present invention relates to improvements in motor vehicles designed especially for use as trucks or conveyors utilizing a dumping or tilting body, and wheel substitutes or tractor belts for driving the vehicle. The body portion or frame of the truck is designed to revolve in a horizontal plane in order that the body may be turned and dumped in practically any desired position, and means are provided for locking the body in normal position. The body of the truck may be reversed as to position in order to eliminate necessity for turning the vehicle around, and a duplex clutch mechanism is provided whereby the truck may be steered by the utilization of its driving means. Means are provided whereby the propeller shaft may be disconnected from the driving mechanism and power transmitted through the propeller shaft to the means for revolving the body of the truck.

The invention consists in certain novel combinations and arrangements of parts for carrying out the above indicated purposes, as will hereinafter be more fully set forth and claimed.

In the accompanying drawings, I have illustrated one complete example of the physical embodiment of my invention wherein the parts are combined and arranged according to the best mode I have so far devised for the practical application of the principles of my invention.

Figure 1 is a view in side elevation of a motor truck embodying my invention;

Fig. 2 is an enlarged detail sectional view at the center of the truck showing the revolving gear ring and the means for locking the body with relation to the main frame of the truck;

Fig. 3 is a transverse vertical sectional view at line 3—3 of Fig. 1;

Fig. 4 is a plan view of the body frame showing the propeller shaft, the means for locking the revolving gear ring and body frame, and the operating means for the driving-steering clutch mechanism;

Fig. 5 is a detail sectional view showing one of the roller bearings for the revolvable body frame; and Fig. 6 is a detail of the drive pinion and a complementary reverse pinion connected to be simultaneously shifted.

In carrying out my invention, I have illustrated the well known type of truck body as 1 which is provided with longitudinally disposed channel beams 2, and the body is hinged at 3 in order that it may be tilted or dumped in usual manner. The body frame comprises a pair of I-beams 4—4 which are spaced apart and these beams are adapted to ride on cross bars 5 and 6 of the main frame. Intermediate cross braces 7 are used to insure a rigid rectangular shaped body frame for the truck, and this body frame with the body 1 is designed to revolve to adjusted position as will hereinafter be described.

At the front of the body frame is supported an engine or motor 8, and the driver of the truck occupies a seat indicated at 9 in convenient position for control of the machine through the use of the steering wheel 10.

Beneath the body frame is rigidly supported a bevel gear ring 11 that has braces 12 and also braces 7 to secure it rigidly as a part of the body frame, and it will be apparent that the truck body, the body frame and the gear ring are designed to revolve together.

The usual transmission mechanism 13 is provided for the motor, and a propeller shaft 14 is connected therewith and supported in bearings 15 of the body frame. The propeller shaft is provided at its rear end with drive pinions 16 and 16', and these pinions selectively engage a driven bevel gear 17, as will be described.

A pair of traction belts as 18 and 19, of the creeper type are used, one at each side of the truck, and each belt has a driving sprocket wheel 20 journaled at the ends of the main axle 21. The driving sprockets are provided with internal gears 22 and these gears mesh with complementary pinions 23 on the driven shaft sections 24 and 25 which have bearings in the spaced I-beams 26. These I-beams are longitudinally disposed with relation to the truck and form part of the main frame of the truck, as distinguished from the relatively movable body frame of the truck. The drive section 24 carries a bevel pinion 27 enclosed in the housing 28 supported on the main axle 21. A bevel gear 29 on the lower end of the vertically disposed centrally located shaft 30 transmits power to the gear 27 and to shaft 27′ and this gear is rigid with the shaft 30 as is also the main bevel gear 17, the shaft 30 being journaled in suitable bearings in the housing 28, as is also the shaft 27′, as best seen in Figure 3.

It will be apparent that the truck is propelled from the shaft 14 through the pinion 16 and main gear 17 and thence through the bevel gear 29 and drive gear 27 and shaft 27′ to the shaft section 24 and 25 by means of which the traction belts 18 and 19 are driven.

The truck is adapted to be driven and steered by the driving mechanism including the shaft sections 24 and 25, and these shaft sections are each provided with a friction clutch mechanism indicated at 31 and 32, respectively. These friction clutches are of well known type, and are located one at each side of the drive gear 27 and arranged so that each clutch may be engaged with its shaft section in order to propel the motor truck, and means are provided whereby a selected clutch may be disengaged while the other clutch remains engaged for the purpose of steering the truck. Thus if a turn is to be made toward the right, the right end clutch as 32 in Fig. 3 will be disengaged. Under these conditions, the belt 19 remains idle, while the belt 18 is driven, and therefore the truck is turned toward the right by the power from the left end traction belt 18. A turn to the left may be accomplished by holding the belt 18 idle and driving the belt 19. Means are provided whereby the clutches may be controlled by the driver from his seat 9, and these means include complementary clutch yokes 33 and 34 pivoted at 35 on the stationary part of the housing 28 in Fig. 3. These clutch yokes are each engaged by a clutch lever as 36 and 37, and these levers are pivoted at 38 on the housing 28. A rock bar 39 parallel with the driving shaft 24—25 is fixed in the body frame between the two beams 4, and a pair of rock levers 40 each having a friction roller 41 are pivoted on this bar 39, and the rollers are in frictional contact with the clutch levers 36 and 37. Thus as the levers 40 are turned on their rock bars 39, the levers swing the clutch levers 36 and 37 on their pivots, and the movement of these clutch levers actuates the clutch yokes, and the clutches are thrown into operative engagement to drive their respective shaft sections 24 and 25. These rock levers 40 which are pivoted on the rock bar 39 are connected by draw rods 42 and 43 with a cross bar 44 which is horizontally disposed and fixed on the steering shaft 45 which is manipulated by the steering wheel 10. Thus it will be apparent that with the device in position of Fig. 4, both of the clutches 31 and 32 are in driving position, and by turning the steering wheel 10 the friction of one clutch is increased while the friction of the opposite clutch is decreased in a manner well understood.

The propeller shaft 14 is normally utilized for transmitting power between the bevel pinion 16 and the bevel gear 17 for the purpose of driving the truck. This shaft is adapted to be shifted longitudinally for the purpose of disengaging the propulsion mechanism and for engaging the means for turning the body frame and body of the truck. For this purpose, a lever 46 is located near the driver's seat and is adapted to be swung on its pivot to rock the shaft 47 that is journaled between the members 4 of the body frame. This rock shaft has a rock arm 48 and this arm is connected by a link 49 to a yoke 50 on the propeller shaft 14. It will be apparent that the propeller shaft may be shifted longitudinally in its bearings by movement of the lever 46, and the propeller shaft is provided with a pinion 51 that is adapted to engage the teeth of the gear ring 11. Thus when the lever 46 is properly shifted, the driving mechanism is disengaged and the bevel pinion 51 is engaged with the gear ring 11 and as the propeller shaft is operated the body frame and body may be turned through the turning of the gear ring 11. The body frame, through its gear ring, is supported on roller bearings 52 which are journaled in bearing heads 53 at the upper ends of posts 54, and these posts are rigid with the main frame 26 of the truck. In Fig. 5, it will be seen that the gear ring 11 is slotted as at 55, and this slot provides an annular track which rides over the rollers 52. When the body frame has been turned to desired position, it is locked in that position by means coacting with the two arcuate connecting bars 5 and 6, as shown in Fig. 4. Each of these bars is provided with a notch as 56 located in its upper face, and as best seen in Fig. 2, a pair of pivoted detents as 57 and 58 are adapted to engage in these notches and lock the body frame against lateral movement relative to the main frame. These detents are carried by rock shafts 59 and 60 that are pivoted in the beams 4 of the body frame, and the detents have friction faces 61 that engage the vertical faces of the bars 5 and 6 as indicated in Fig. 2. In this position, the detents form brakes for retarding the swinging or revolving movement of the body frame, and when the brake is applied it will be apparent that the detents will slip into the notches 56 when they register with the notches, to lock the body frame and the main frame as indicated in Fig. 4. The two shafts 59 and 60 are operated from the pedal 62 which is pivoted at 63 in the body frame, and a connecting rod 64 is pivoted at its ends to these detents 57 and 58. A spring 65 is used in connection with the pedal to hold it in normal position, and it will be apparent that the pedal may be operated by the driver in controlling the swinging or revolving movement of the body frame and body of the truck. As an auxiliary means of reversing the direction of drive the drive pinion 16 may have on its sleeve a complementary reverse gear 16' and the sleeve may be provided with a suitable shifting device as $x$ so that the selected gear may be enmeshed with the gear 17 and this movement be independent of the gear shift to throw out the pinion 16 when the gear 51 is used to turn the body of the truck.

Having thus fully described my invention, what I claim as new and desire to secure by Letters Patent is—

The combination in a motor truck with its frame, a central axle rigid with the frame, and driving belts at the outer sides of the frame, of a central housing supported on the axle and a transversely disposed driving shaft journaled in the housing, a drive gear on said shaft, a pair of clutch shafts alined with the drive shaft and journaled in the frame, clutch devices at the sides of the housing for the clutch shafts and means for independently operating the clutch devices, a longitudinally disposed propeller shaft and a propeller pinion thereon, a vertical shaft journaled in the housing and a gear thereon for engaging the propeller pinion, and a pinion on the vertical shaft engaging the gear on the driving shaft.

In testimony whereof I affix my signature.

JOHN T. SULLIVAN.